July 10, 1928.

E. W. LACOSS 1,676,699

PARING KNIFE

Filed Oct. 25, 1926

Inventor
E. W. Lacoss,

By Clarence A. O'Brien

Attorney

Patented July 10, 1928.

1,676,699

UNITED STATES PATENT OFFICE.

EDWARD WILLIAM LACOSS, OF FLORENCE, KANSAS.

PARING KNIFE.

Application filed October 25, 1926. Serial No. 144,057.

This invention relates to new and useful improvements in paring knives and has for its primary object to provide a paring knife wherein the blade thereof is provided with a removable guard that is so constructed and associated with respect to the knife blade as to regulate the depth of the cut into the fruit or vegetables being pared.

A further object of the invention is to provide a paring knife equipped with a guard that is readily removable and wherein the attaching means between the guard and the blade is such as to permit the guard to be moved inwardly or outwardly with respect to the cutting edge of the blade so as to adjust the guard action in the paring of fruits or vegetables of different skin thicknesses.

A still further and important object is to provide attaching means between the guard and the blade wherein the guard will be maintained rigidly in adjusted position with respect to the blade cutting edge.

Other objects will become apparent as the nature of the invention is better understood, the same comprising the novel form, combination, and arrangement of parts hereinafter more fully described, shown in the accompanying drawing and claimed.

In the accompanying drawing wherein like reference characters indicate corresponding parts throughout the several views.

Figure 1:
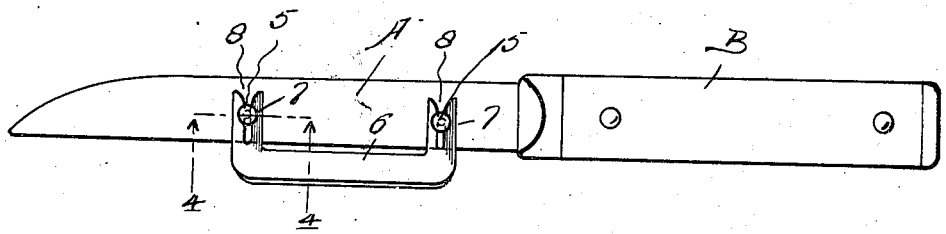
Figure 1 is a side elevation of a paring knife constructed in accordance with the present invention.
Figure 2:
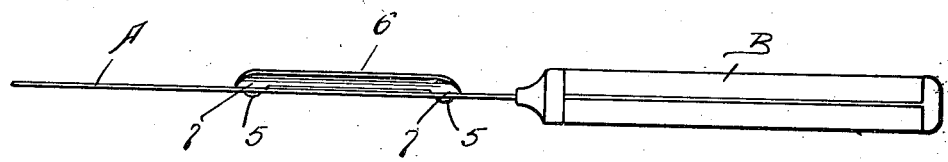
Figure 2 is a cutting edge elevation of the knife.
Figure 3:
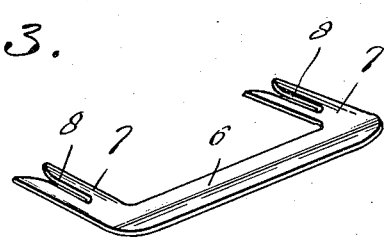
Figure 3 is a perspective of the guard, per se.
Figure 4:
Figure 4 is an enlarged longitudinal section taken substantially upon the line 4—4 of Figure 1 for more clearly disclosing the attaching means between the knife blade and the guard.

Now having particular reference to the drawing there is disclosed a generally conventional form of knife consisting of a cutting blade A, equipped at one end with the usual handle B. Rigidly associated with the blade A in predetermined longitudinally spaced relation is a pair of headed rivets 5—5 the heads of which are in slightly spaced relation with the adjacent surface of the blade A as clearly disclosed in the sectional view, Figure 4.

The guard consists of a metallic blade 6 that is bent upwardly at its outer edge so as not to interfere at its outer edge with the fruit or vegetables being pared. At the opposite ends of this guard blade the same is formed with inwardly extending fingers 7—7, both of which are of concavo-convex formation so that the opposite edges thereof will engage the surface of the blade A when the guard is attached thereto, also clearly indicated in said Figure 4. The inner ends of these fingers 7—7 are formed with longitudinal slots 8—8 that open at the inner ends thereof for receiving the rivets 5—5 when the guard is attached to the knife blade.

The concavo-convex formation of these fingers 7—7 is such that the apices thereof are of greater elevation than the headed ends of the rivets 5—5 for obviously necessitating the forced engagement of the fingers with the rivets 5—5 and for causing the opposite longitudinal edges of the fingers to frictionally engage the surface of the blade by reason of the heads of the rivets forcing downwardly upon the apices of the fingers.

Obviously by regulating the space between the inner edge of the guard blade 6 and the cutting edge of the knife blade A, the depth of the cut into the fruit or vegetables will be regulated for permitting of the proper paring operation regardless of the skin thickness of the fruit or vegetables being pared.

It will thus be seen that I have provided a highly novel, simple, and efficient form of paring knife that is well adapted for all the purposes heretofore designated and even though I have herein shown and described the invention as consisting of certain detail structural elements it is nevertheless to be understood that some changes may be made therein without affecting the spirit and scope of the appended claim.

Having thus described the invention, what I claim as new and desire to secure by Letters Patent is:—

In a paring knife of the class described, a cutting blade, a pair of headed rivets associated with the blade in spaced longitudinal relation, the heads of the rivets being spaced from the adjacent side face of the blade, a gage blade, the lower edge portion thereof being slightly bent outwardly, upwardly extending fingers at the opposite ends of the gage blade, said fingers being of concavo-convex formation in transverse section and being formed with slots which extend downwardly from the upper ends of the fingers for engagement with the headed rivets to facilitate the attachment of the gage blade in predetermined spaced relation with respect to the cutting edge of the knife blade, the heads of said rivets adapted to overlie the slots of said fingers, the fingers being wedged between the knife blade and the heads for frictional locking engagement with the knife blade.

In testimony whereof I affix my signature.

EDWARD WILLIAM LACOSS.